United States Patent
Mitchell

(10) Patent No.: US 9,984,591 B2
(45) Date of Patent: May 29, 2018

(54) MODEL FOR PRACTICING CUTTING

(71) Applicant: John R. Mitchell, Wayland, IA (US)

(72) Inventor: John R. Mitchell, Wayland, IA (US)

(*) Notice: Subject to any disclaimer, the term of this patent is extended or adjusted under 35 U.S.C. 154(b) by 463 days.

(21) Appl. No.: 14/046,170

(22) Filed: Oct. 4, 2013

(65) Prior Publication Data
US 2014/0099619 A1   Apr. 10, 2014

Related U.S. Application Data

(60) Provisional application No. 61/709,415, filed on Oct. 4, 2012.

(51) Int. Cl.
*G09B 23/28* (2006.01)
*G09B 23/30* (2006.01)

(52) U.S. Cl.
CPC ............. *G09B 23/28* (2013.01); *G09B 23/30* (2013.01)

(58) Field of Classification Search
CPC ................................ G09B 23/28; G09B 23/30
USPC .......................................... 434/267; 170/267
See application file for complete search history.

(56) References Cited

U.S. PATENT DOCUMENTS

| | | | | |
|---|---|---|---|---|
| 1,130,084 | A * | 3/1915 | Havens | G09F 11/26 40/472 |
| 4,332,570 | A * | 6/1982 | Getty | G09B 23/32 434/274 |
| 2008/0064017 | A1* | 3/2008 | Grundmeyer, III | G09B 23/28 434/262 |
| 2012/0116271 | A1* | 5/2012 | Caruso | A61B 18/203 601/6 |

OTHER PUBLICATIONS

"Endless Sketchbook," MoHDI, instructables.com, http://web.archive.org/web/20100430102951/http://www.instructables.com/id/Endless-Sketchbook/, Apr. 30, 2010.*

* cited by examiner

*Primary Examiner* — Thomas Hong
*Assistant Examiner* — Jennifer L Korb
(74) *Attorney, Agent, or Firm* — Shuttleworth & Ingersoll, PLC; Brett Papendick

(57) ABSTRACT

A model for practicing surgical procedures which involve the cutting of skin and or tendons. A covering representing skin is stretched around a frame. A band can be added which represents tendons or ligaments. An elongated rod assists in maintaining the position of the covering and the band. Once the covering and band is cut, a new covering and new band can be placed on the frame.

15 Claims, 4 Drawing Sheets

MODEL FOR PRACTICING CUTTING

CROSS-REFERENCE TO RELATED APPLICATIONS

The present application claims priority to provisional patent application 61/709,415 which was filed on Oct. 4, 2012, and is hereby expressly incorporated by reference in its entirety.

BACKGROUND OF THE INVENTION

For various reasons, a portion of medical doctors can be apprehensive about the cutting of particular areas of the body. In particular, the area of the Achilles tendon presents unique challenges to doctors performing surgeries in this area of the body. A model mimicking the anatomy of a particular region of the body would allow a doctor to practice prior to conducting the actual surgery.

It is therefore an object of the present invention to provide individuals with a model which will allow them to practice a surgery.

It is therefore a further object of the present invention to provide such a model that can be reused.

SUMMARY OF THE INVENTION

A model for practicing cutting of a tendon includes a frame, a covering representing skin, and a band representing a tendon. The covering which can be made of plastic or some other type of material is wrapped around the frame. The frame is meant to have a similar structure to that of the back portion of a human leg near the ankle. The band is placed between the frame and the covering and represents a tendon such as the Achilles tendon.

An elongated rod preferably made of metal fits into a slot of the frame and stretches the covering and assists in maintaining the covering and band in place. A user of the model can then practice cutting of the "skin" and "tendon" via the model prior to performing a similar operation on a live subject. As the covering and the band can be replaced easily, the frame can be used over and over for practice.

DETAILED DESCRIPTION

Figure 1:
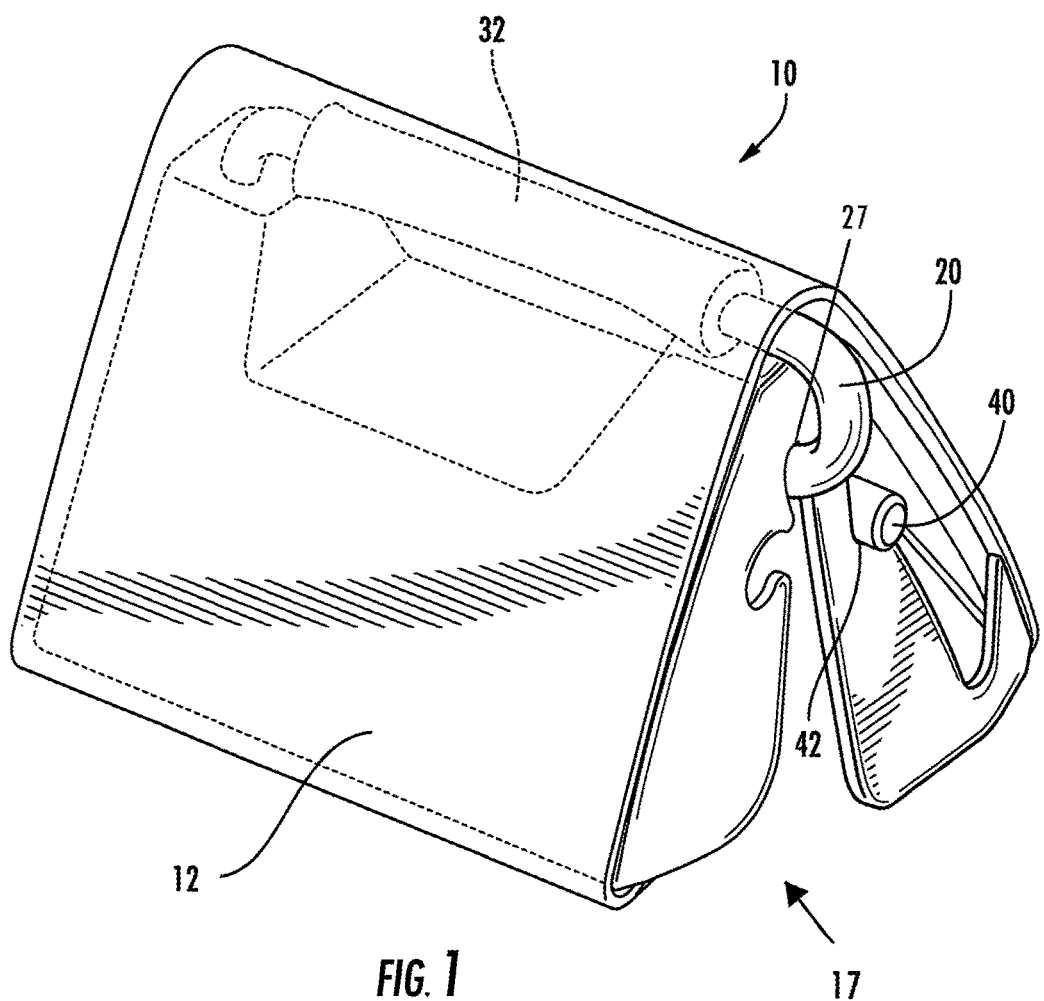
FIG. 1 is a perspective view of the invention.

Now referring to the drawings, FIGS. 1-5 are different views of a device 10 showing a covering 12, representing skin, which surrounds a portion of an underlying frame 14. A band 16 represents a typical tendon such as the Achilles tendon and is preferably made of an elastic material. The band 16 is stretched the length of the frame 14. As the band 16 is preferably made of an elastic material and is in a linear or ring-like formation, the band 16 is located on both sides of the frame 14.

Figure 6:
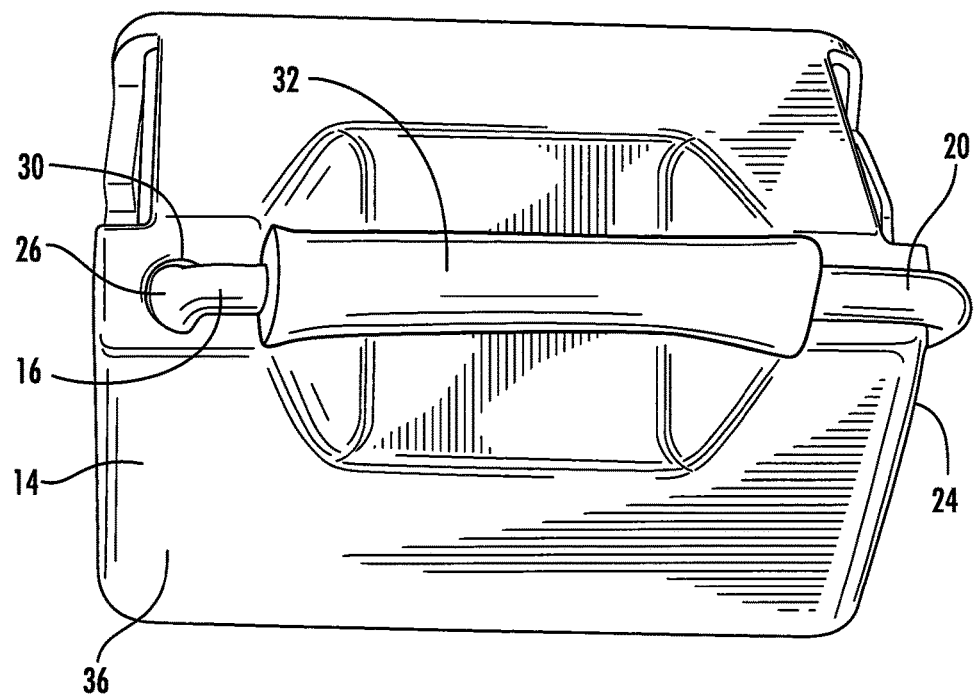
FIG. 6 is a top view of the invention when the synthetic skin has been removed.

As seen in FIG. 6 which shows the invention without the covering 12, the band 16 has a first portion 20 wrapped around a first side 24 of the frame 14, while a second portion 26 of the band 16 is inserted into a hole 30 in the frame 14. As shown in FIG. 1, the first side 24 has a notch 27 which holds the first portion 20 of the band 16. The notch 27 is above a slot 42 on the first side 24 of the frame 14. The band 16 is held in place preferably by friction and is preferably taut, it is to be understood that the hole 30 could be replaced with a slot that can accommodate the band 16. Such an arrangement may facilitate the use of a circular band. A sheath 32 represents a secondary structure of the body such as synovium and surrounds a portion of the band 16.

Figure 2:
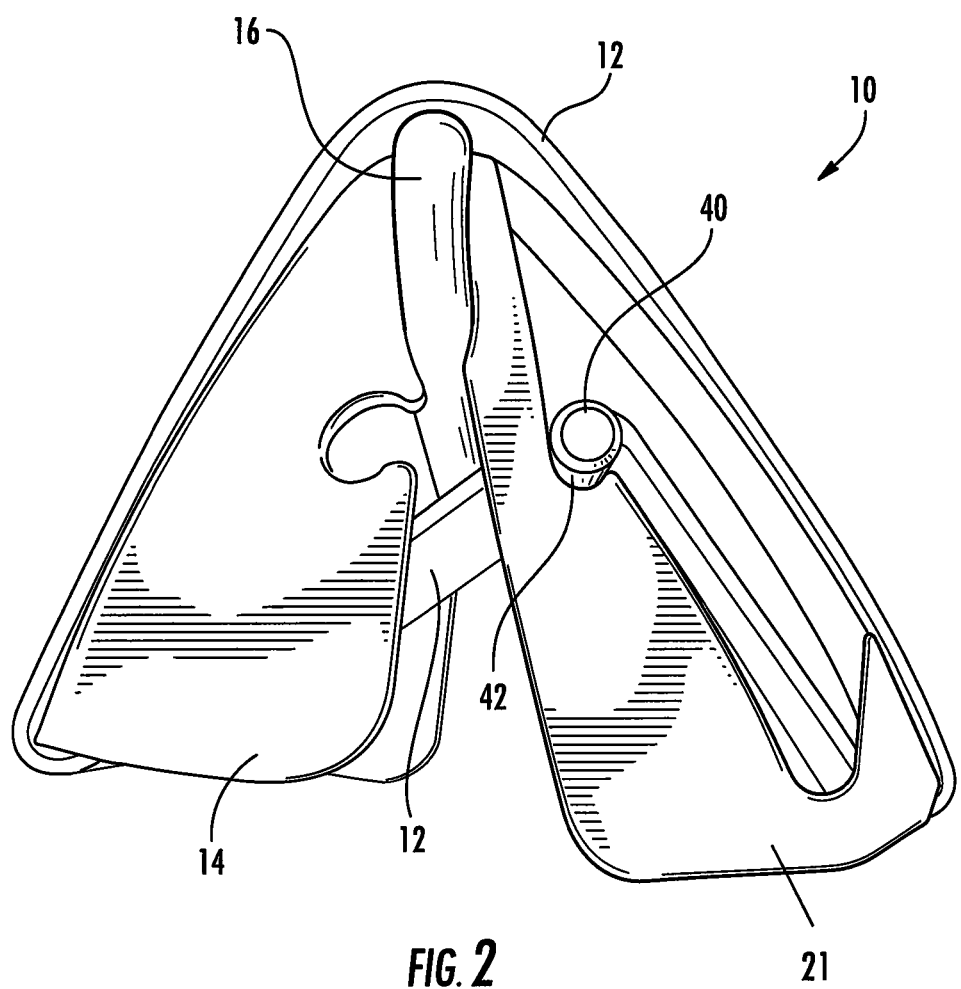
FIG. 2 is a left side view of the invention.
Figure 4:
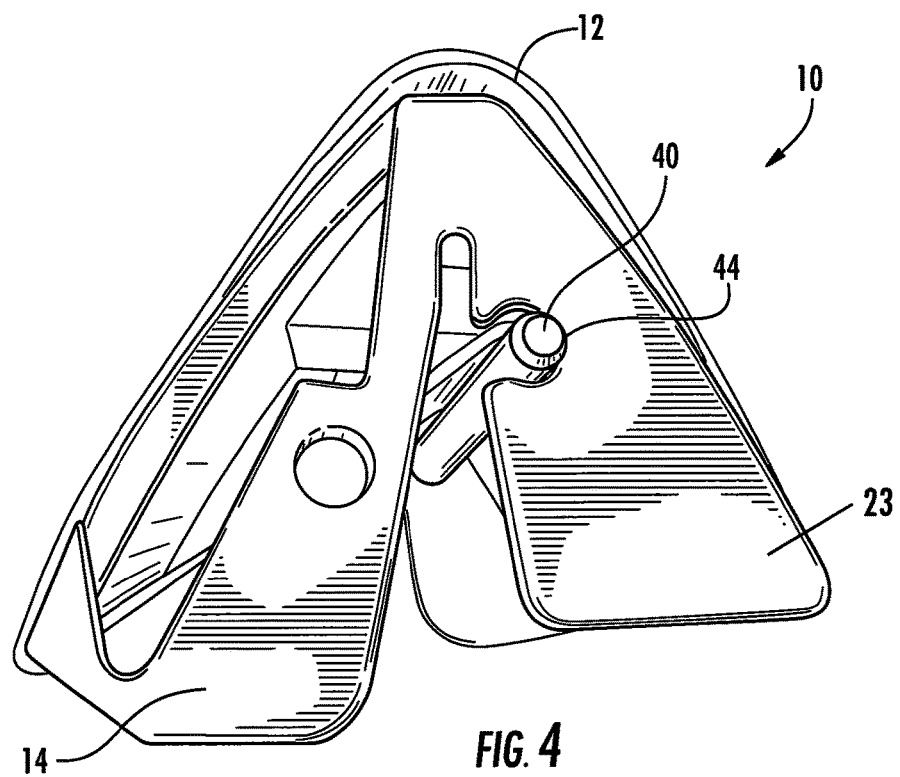
FIG. 4 is a right side view of the invention.
Figure 5:
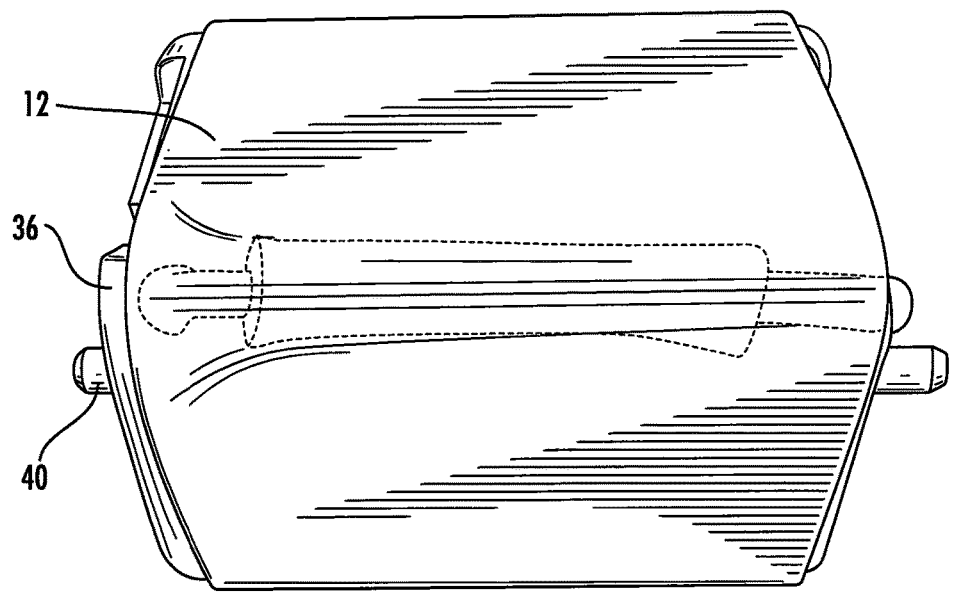
FIG. 5 is a top view of the invention.

As seen in FIGS. 2 and 4, the covering 12 stretches around the frame 14. The frame 14 is preferably shaped like a pyramid with at least one open side 17. A first side 21 and a second side 23 are triangular in shape. This shape allows the covering 12 to be stretched on an outside 36 of the frame 14 as well as an inside 38 of the frame 14. In order to remake the covering 12 taut and to assist in securing the covering 12, an elongated bar 40 is inserted into the frame 14.

Figure 3:
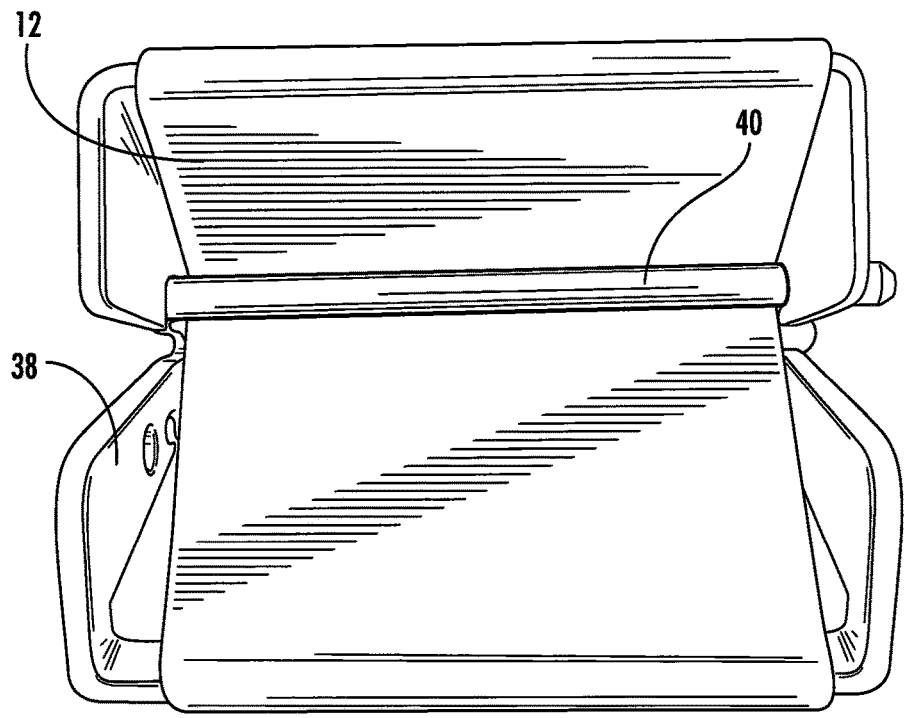
FIG. 3 is a bottom view of the invention.

As seen in FIGS. 3 and 4, the elongated rod 40 is snapped into place into slots 42 and 44. Slots 42 and 44 are located on opposite sides of the frame 14. The slots 42 and 44 are preferably rounded to accommodate the cylindrical shaped elongated rod 40. A first portion of the rod 40 makes contact with slot 42 while a second portion of rod 40 makes contact with slot 44. The elongated rod is preferably put into place after the covering 12 has been wrapped around the frame 14. The elongated rod 40 is inserted by a user forcing the rod 40 upwards which stretches the covering 12 making it tauter than without the rod 40. If the covering 12 is one circular piece then an unstretched covering 12 has a first circumference. When the rod 40 is placed into the device 10, the covering 12 is stretched such that the coveting 12 has a second circumference which is greater than the first circumference. The rod 40 is then placed in the slots 42 and 44. The downward force of the covering 12 assists in maintaining the position of the rod 40.

Once the device is set up with the covering 12, sheath 32 and band 16 it is ready for use by an individual such as a doctor. The doctor can then practice cutting the covering 12 representing skin, and/or sheath 32 representing synovium, and/or band 16 representing a tendon with a scalpel or similar cutting instrument. Once the covering 12, sheath 32 and/or band 16 is cut on the device 10, replacement parts can be used so that the model can be reused for future practicing. The covering 12, band 16 and rod 40 are all selectively removable to assist in replacing the parts of the device 10. Additionally, any one or combination of the covering 12, sheath 32 and band 16 can be removed in order to practice different medical procedures on the model.

Having thus described the invention in connection with the several embodiments thereof, it will be evident to those skilled in the art that various revisions can be made to the several embodiments described herein with out departing from the spirit and scope of the invention. It is my intention, however, that all such revisions and modifications that are evident to those skilled in the art will be included with in the scope of the following claims. Any elements of any embodiments disclosed herein can be used in combination with any elements of other embodiments disclosed herein in any manner to create different embodiments.

What is claimed is:

1. A device for practicing surgical procedures, comprising:
   a frame;
   an elastic band;
   a covering representing skin;
   the covering is a continuous loop;

wherein the band and covering are stretched around the frame;
a single elongated rod;
the frame comprising a first slot;
a first portion of the elongated rod in the first slot;
the frame having a first side;
the first side of the frame having a notch;
the notch holding a first portion of the elastic band;
the first slot lower on the frame than the notch;
the frame comprising a hole on the upper portion of the frame;
wherein a second portion of the elastic band is in the hole;
a sheath around the elastic band;
the frame having an entirely open bottom for facilitating replacement of the covering, the elastic band and the sheath;
the first slot in communication with the open bottom;
a recess below the sheath;
wherein the recess is concave;
wherein the recess allows a user of the device to use a cutting instrument to fully cut a diameter of the sheath and a diameter of the elastic band.

2. The invention of claim 1, further comprising:
a second slot;
a second portion of the elongated rod in the second slot.

3. The invention of claim 2, wherein:
the covering is stretchable.

4. The invention of claim 3, wherein:
the covering has a first circumference.

5. The invention of claim 4, wherein:
the covering has a second circumference;
the second circumference greater than the first circumference;
the covering having the second circumference when the covering is stretched around the elongated rod.

6. The invention of claim 5, wherein:
the elongated rod is selectively removable from the frame.

7. The invention of claim 6, wherein:
the covering is selectively removable from the frame.

8. The invention of claim 7, wherein:
the elastic band is selectively removable from the frame.

9. The invention of claim 8, wherein:
the frame is triangular in shape.

10. A device for practicing surgical procedures, comprising:
a frame;
a band;
the band able to fit over a portion of the frame;
a sheath around the band;
a single elongated rod;
a covering;
the covering is a continuous loop;
a first slot;
a second slot;
the elongated rod selectively removable from the first and second slot;
the frame having a first side;
the first side of the frame having a notch;
the notch holding a first portion of the band;
the first slot lower on the frame than the notch;
the frame comprising a hole on the upper portion of the frame;
wherein a second portion of the band is in the hole;
a recess below the sheath;
wherein the recess is concave;
wherein the concavity of the recess allows a user of the device to use a cutting instrument to fully cut a diameter of the sheath and a diameter of the band.

11. The invention of claim 10, wherein:
the sheath covers the band.

12. The invention of claim 11, wherein:
the covering is selectively removable from the frame.

13. The invention of claim 12, wherein:
the band is selectively removable from the frame.

14. The invention of claim 13, wherein:
the covering is stretchable.

15. The invention of claim 14, wherein:
the frame is made of plastic.

* * * * *